United States Patent
Nitta

(10) Patent No.: US 7,923,879 B2
(45) Date of Patent: Apr. 12, 2011

(54) PERMANENT MAGNET MOTOR AND WASHING MACHINE PROVIDED THEREWITH

(75) Inventor: Isamu Nitta, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 101 days.

(21) Appl. No.: 12/265,097

(22) Filed: Nov. 5, 2008

(65) Prior Publication Data
US 2009/0115361 A1    May 7, 2009

(30) Foreign Application Priority Data

Nov. 5, 2007  (JP) ................................. 2007-287442
Apr. 25, 2008 (JP) ................................. 2008-115361
Aug. 20, 2008 (JP) ................................. 2008-211690

(51) Int. Cl.
*H02K 21/12* (2006.01)
(52) U.S. Cl. .................................................. 310/156.44
(58) Field of Classification Search ............. 310/156.44, 310/156.45, 156.53, 156.56, 156.58
See application file for complete search history.

(56) References Cited

U.S. PATENT DOCUMENTS

| | | | | |
|---|---|---|---|---|
| 3,322,987 A | * | 5/1967 | Kohlhagen | ................. 310/164 |
| 4,217,508 A | * | 8/1980 | Uzuka | ................. 310/46 |
| 4,405,873 A | * | 9/1983 | Nondahl | ................. 310/156.56 |
| 4,866,381 A | * | 9/1989 | Tatsuhiko | ................. 324/207.25 |
| 5,705,871 A | * | 1/1998 | Suzuki et al. | ................. 310/156.44 |
| 6,441,522 B1 | | 8/2002 | Scott | |
| 7,405,502 B2 | * | 7/2008 | Jun et al. | ................. 310/156.01 |

FOREIGN PATENT DOCUMENTS

| | | |
|---|---|---|
| CN | 1212303 | 3/1999 |
| CN | 1213208 | 4/1999 |
| JP | 07-336980 | 12/1995 |
| JP | 08-214478 | 8/1996 |
| JP | 2006-280195 A | 10/2006 |
| KR | 10-2006-0027530 | 3/2006 |
| KR | 10-0693854 | 3/2007 |

OTHER PUBLICATIONS

Chinese Office Action dated Aug. 20, 2010.
Korean Office Action dated Nov. 29, 2010.

* cited by examiner

*Primary Examiner* — Dang D Le
(74) *Attorney, Agent, or Firm* — Pillsbury Winthrop Shaw Pittman, LLP

(57) ABSTRACT

A permanent magnet motor includes a rotor and a plurality of permanent magnets located inside a rotor core. One or more of the permanent magnets having relatively smaller coercive forces have a first magnetic characteristic that when a magnetizing magnetic field is caused to act on the permanent magnets, a magnetic susceptibility is substantially at 0 until reaching an inflection point during magnetization, and when exceeding the inflection point, the magnetic susceptibility enters a loop approximating to the hysteresis loop in a first quadrant, and a second magnetic characteristic that when a demagnetizing magnetic field is caused to act on the permanent magnets, a magnetic susceptibility is substantially at 0 until reaching the inflection point during demagnetization, and when exceeding the inflection point, the magnetic susceptibility enters a loop approximating to the hysteresis loop in a second quadrant.

13 Claims, 12 Drawing Sheets

PERMANENT MAGNET MOTOR AND WASHING MACHINE PROVIDED THEREWITH

CROSS-REFERENCE TO RELATED APPLICATIONS

This application is based on and claims the benefit of priority from the prior Japanese Patent Application Nos. 2007-287442, filed on Nov. 5, 2007, 2008-115361, filed on Apr. 25, 2008 and 2008-211690, filed on Aug. 20, 2008, the entire contents of which are incorporated herein by reference.

BACKGROUND OF THE INVENTION

1. Field of the Invention

The present invention relates to a permanent magnet motor comprising a plurality of permanent magnets provided in a rotor core and a washing machine provided with the permanent magnet motor.

2. Description of the Related Art

Magnetic flux is generated by permanent magnets in a permanent magnet motor of the above-described type. The magnetic flux is interlinked with stator windings. It has been desired that an amount of magnetic flux interlinked with stator windings (an amount of interlinkage magnetic flux) should properly be adjusted according to load driven by the permanent magnet motor. However, permanent magnets provided in permanent magnet motors are generally composed of a single type of permanent magnet. Accordingly, an amount of magnetic flux of the permanent magnets is usually constant. For example, when a permanent magnet motor comprises permanent magnets with a large coercive force, voltage induced by the permanent magnets during high-speed rotation is rendered excessively high, resulting in possible breakdown of electronic components. On the other hand, when a permanent magnet motor comprises permanent magnets with a small coercive force, output power during low speed rotation is reduced.

For example, Japanese patent application publication, JP-A-2006-280195 discloses a permanent magnet motor comprising two types of permanent magnets with different coercive forces provided in a rotor core. In the disclosed permanent magnet motor, the permanent magnets with a smaller coercive force are magnetized or demagnetized by an external magnetic field due to armature reaction (a magnetic field generated by electric current flowing into stator winding), whereby an amount of magnetic flux of the permanent magnets is adjusted.

However, both permanent magnets with large and small coercive forces are disposed in each part constituting one magnetic pole inside a rotor core in the permanent magnet motor disclosed by the above-referenced publication. More specifically, the permanent magnet motor of the above-referenced publication is constructed so that one magnetic pole is formed by a plurality of types of permanent magnets. As a result, the number of permanent magnets is increased and a cubic volume of each magnet needs to be rendered smaller, whereupon the structure of the motor is complicated.

BRIEF SUMMARY OF THE INVENTION

Therefore, an aspect of the present invention is to provide a permanent magnet motor in which an amount of magnetic flux generated by permanent magnets can be adjusted according to load to be driven by a simpler construction without incurring dielectric breakdown during high-speed rotation and power reduction during low-speed rotation and with a simpler construction, and a washing machine provided with the permanent magnet motor.

The present invention provides a permanent magnet motor comprising a rotor including a rotor core and a plurality of permanent magnets provided inside the rotor core and establishing a plurality of magnetic poles. In the permanent magnet motor, the permanent magnets include a plurality of types of permanent magnets having different coercive forces and said plurality of types of permanent magnets is disposed so that each one type constitutes one magnetic pole.

According to the above-described construction, the dielectric breakdown can be prevented during high-speed rotation and the power reduction can be prevented during low-speed rotation. Furthermore, an amount of magnetic flux generated by the permanent magnets can be adjusted according to load driven by the motor.

The present invention also provides a washing machine comprising a permanent magnet motor and a control which controls drive of the permanent magnet motor. In the washing machine, the permanent magnet motor includes a rotor including a rotor core and a plurality of permanent magnets provided inside the rotor core and establishing a plurality of magnetic poles. The permanent magnets include a plurality of types of permanent magnets having different coercive forces. Said plurality of types of permanent magnets is disposed so that each one type constitutes one magnetic pole. The control is arranged so as to change a magnetization state of the permanent magnets having a relatively smaller coercive force.

DETAILED DESCRIPTION OF THE INVENTION

Figure 1:
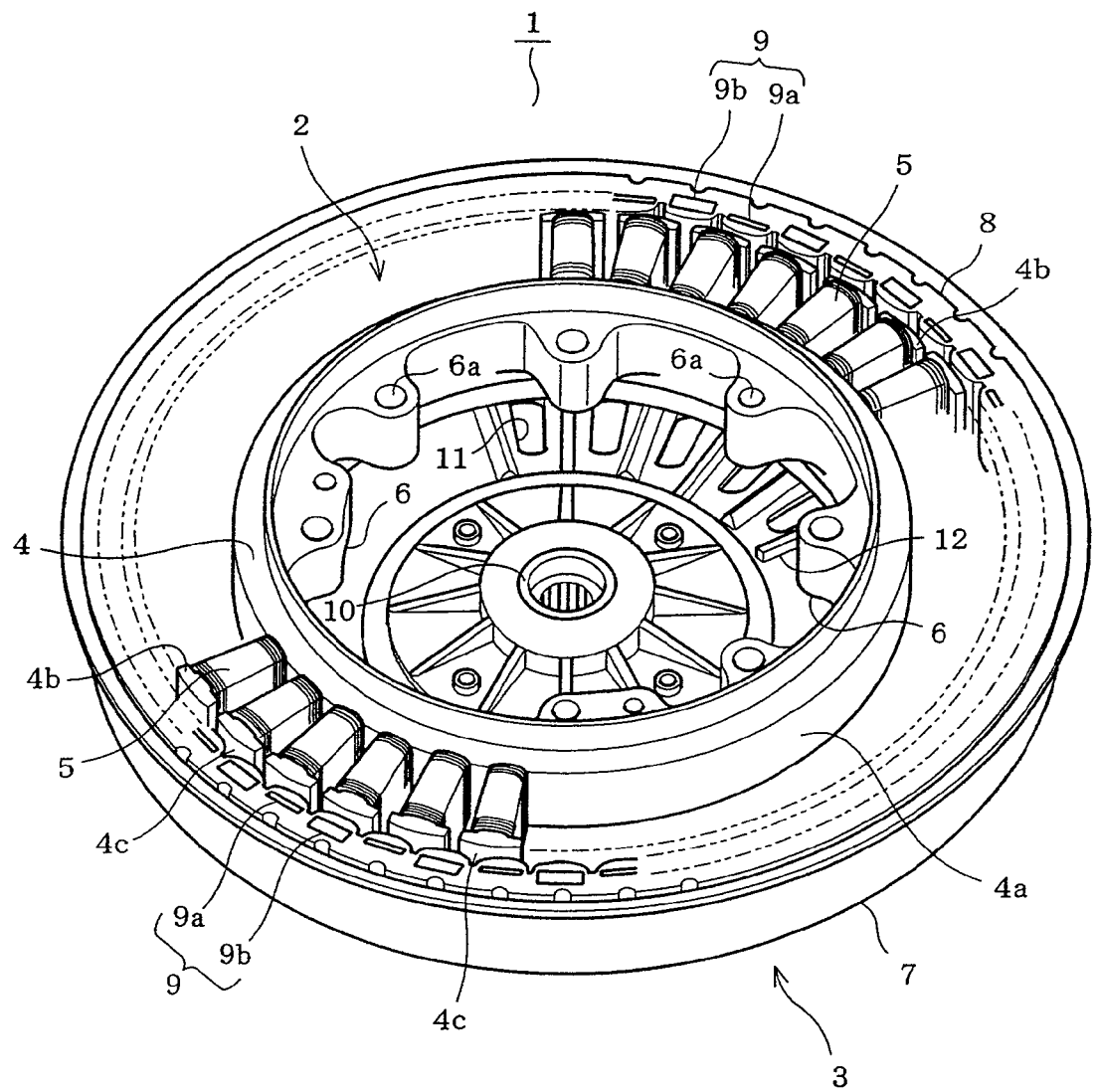
FIG. 1 is a schematic perspective view of an overall permanent magnet motor in accordance with a first embodiment of the present invention.
Figure 2:
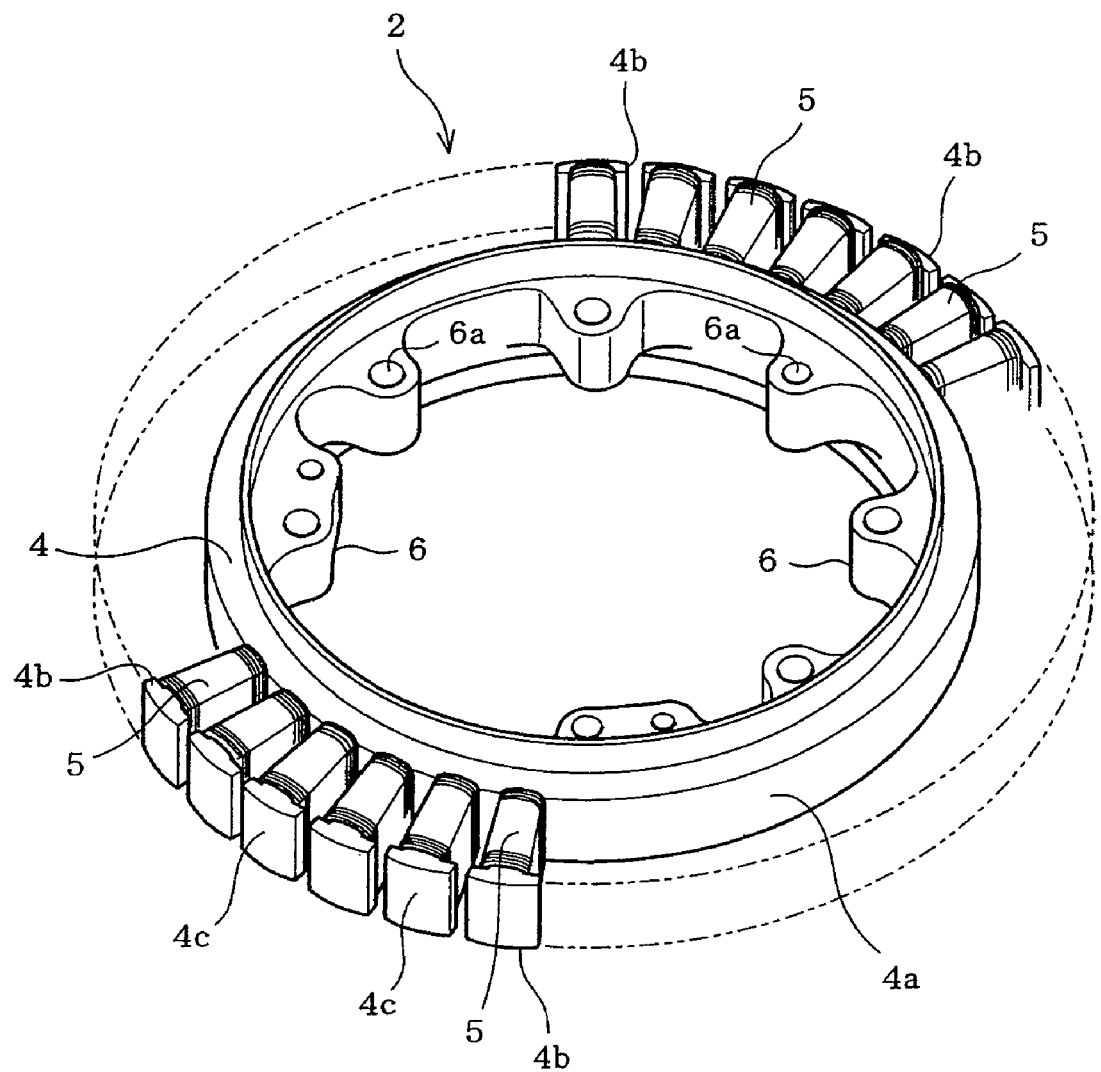
FIG. 2 is a schematic perspective view of a stator of the motor.

A first embodiment of the present invention will be described with reference to FIGS. 1 to 7 of the accompanying drawings. Referring to FIG. 1, an entire construction of a permanent magnet motor 1 (a brushless motor of the outer rotor type) of the embodiment is shown. The permanent magnet motor 1 comprises a stator 2 and a rotor 3 provided along an outer circumference of the stator 2. The stator 2 comprises a stator core 4 and a plurality of stator windings 5. The stator core 4 is formed by stacking and pressing a number of silicon steel plates serving as a punched soft magnetic material. The stator core 4 includes an annular yoke 4a and a number of teeth 4b protruding radially from an outer circumference of the yoke 4a. The stator core 4 has a surface covered with a polyethylene terephthalate (PET) resin (molded resin) except for outer circumferential faces 4c which cooperate with an inner circumference of the rotor 3 thereby to define a gap therebetween. Furthermore, a plurality of mounting portions 6 is formed integrally along the inner circumference of the stator 2. The mounting portions 6 have respective screw holes 6a. The mounting portions 6a are screwed so that the stator 2 is secured to a rear of a water tub 25 (see FIG. 6) of a drum type washing and drying machine 21. The stator winding 5 comprises a three-phase winding, for example and is wound on the teeth 4b.

Figure 3:
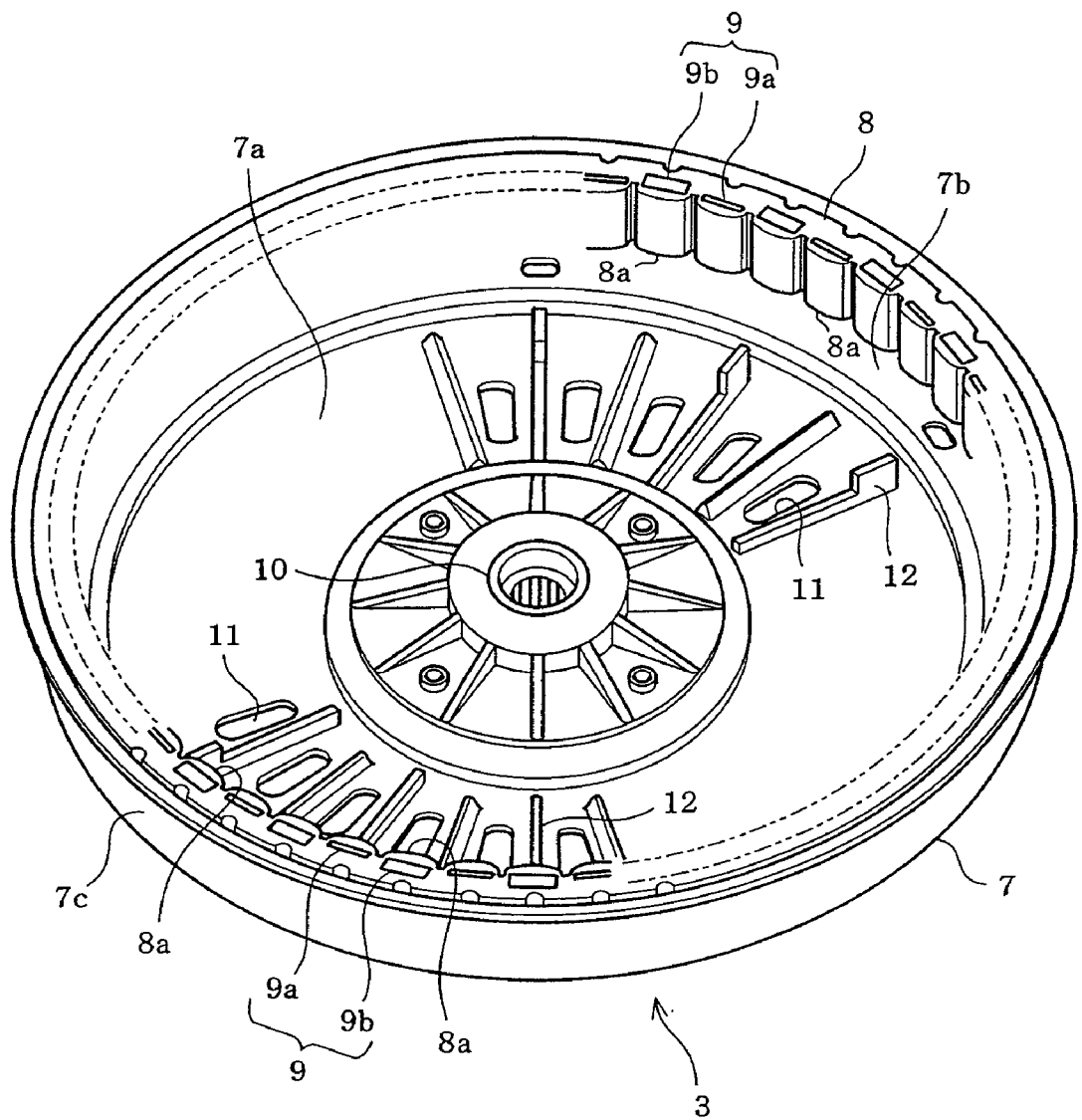
FIG. 3 is a schematic perspective view of a rotor of the motor.

The rotor 3 comprises a frame 7, a rotor core 8 and a plurality of permanent magnets 9 all of which are integrated with one another by molded resin (not shown) as shown in FIGS. 1 and 3. The frame 7 is formed by pressing an iron plate into a flat bottomed cylindrical shape. The frame 7 includes a circular main plate 7a and a circumferential wall 7c rising from an outer circumference of the main plate 7a with a stepped portion 7b being interposed there between. The main plate 7a includes a centrally formed shaft mount 10 to which a rotational shaft 26 (see FIG. 6) is mounted. The main plate 7a has a plurality of vent holes 11 and a plurality of ribs 12 both of which are formed to extend radially about the shaft mount 10.

The rotor core 8 is made by stacking and pressing a number of silicon steel plates serving as a soft magnetic material punched out substantially annularly. The rotor core 8 is disposed along an inner circumference of the circumferential wall 7c. The rotor core 8 has a plurality of protrusions 8a each of which protrudes inward from an inner circumferential surface thereof into an arc shape, whereupon the inner circumferential surface is formed into a rugged shape. The inner circumferential surface of the rotor core 8 is opposed to an outer circumferential surface of the stator 2 (an outer circumferential surface of the stator core 7) thereby to define a gap in cooperation with the stator 2.

Figure 4:
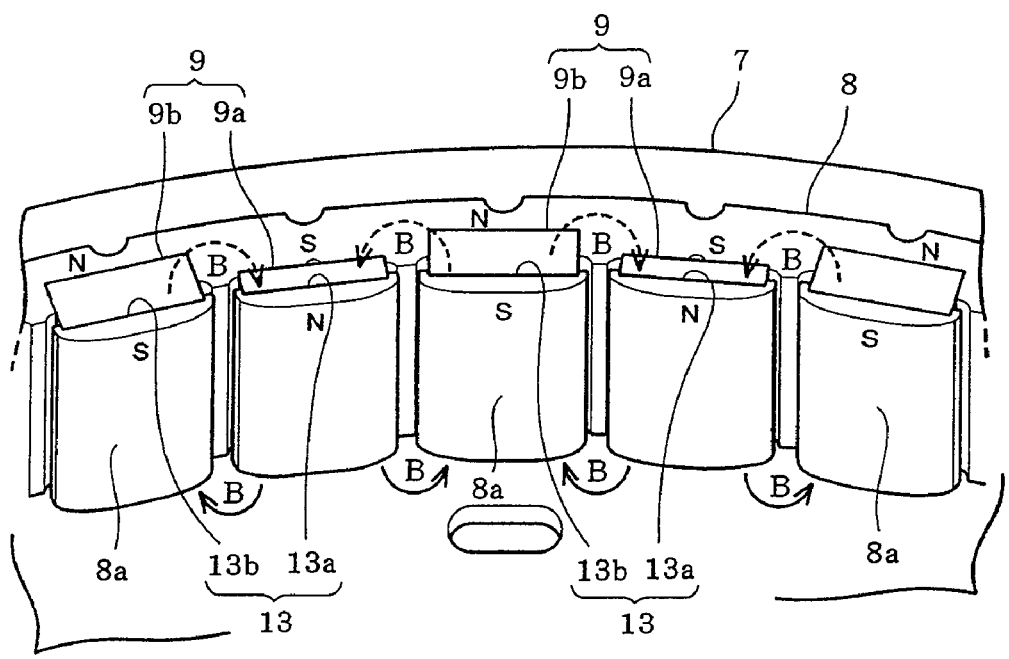
FIG. 4 is a partially enlarged view of a part of the rotor.

Referring now to FIG. 4, rectangular insertion holes 13 are formed so as to extend axially through the rotor core 8 (the direction in which the silicon steel plates are stacked). The insertion holes 13 are disposed annularly along the rotor core 8. The insertion holes 13 include two types of insertion holes 13a and 13b having short sides with different lengths. In this case, the short side of each insertion hole 13a has a length of 2.1 mm where as the short side of each insertion hole 13b has a length of 4.1 mm. The insertion holes 13a and 13b are formed alternately along the circumference of the rotor core 8.

The permanent magnets 9 include rectangular neodymium magnets inserted into the respective insertion holes 13a and rectangular samarium-cobalt magnets inserted into the respective insertion holes 13b. More specifically, each permanent magnet 9a comprises a neodymium magnet belonging to a rare-earth magnet, where as each permanent magnet 9b comprises a samarium-cobalt magnet belonging to the rare-earth magnet. Each neodymium magnet 9a has a coercive force of about 900 kA/m, where as each samarium-cobalt magnet 9b has a coercive force ranging from about 200 to 500 kA/m. Accordingly, each neodymium magnet 9a has a coercive force 1.5 to 4.5 times larger than each samarium-cobalt magnet 9b. Thus, the permanent magnets 9 include two types of permanent magnets 9a and 9b having different coercive forces. The permanent magnets 9a and 9b are arranged alternately into an annular disposition.

Each of the two types of permanent magnets 9a and 9b is disposed so as to constitute one magnetic pole and so as to have a magnetization direction following a radial direction of the permanent magnet motor 1 (the direction heading a gap between the stator 2 and the rotor 3 out of the outer circumference of the permanent magnet motor 1). Thus, when the two types of permanent magnets 9a and 9b are arranged alternately so that the magnetization direction follows the radial direction of the permanent magnet motor 1, the permanent magnets 9a and 9b adjacent to each other have magnetic poles located oppositely or are oppositely magnetized. More specifically, the north pole (N) of one of two types of permanent magnets is located inside and the north pole (N) of the other type of permanent magnet is located outside. Consequently, a magnetic path (magnetic flux) is established, for example, in the directions of arrows B in FIG. 4 between the neodymium magnet 9a and the samarium-cobalt magnet 9b. Broken line arrows in FIG. 4 denote magnetic flux routed through the rotor core 8. As the result of the above-described construction, a magnetic path is established so as to pass through each neodymium magnet 9a with a larger coercive force and each samarium-cobalt magnet 9b with a smaller coercive force.

Figure 5:
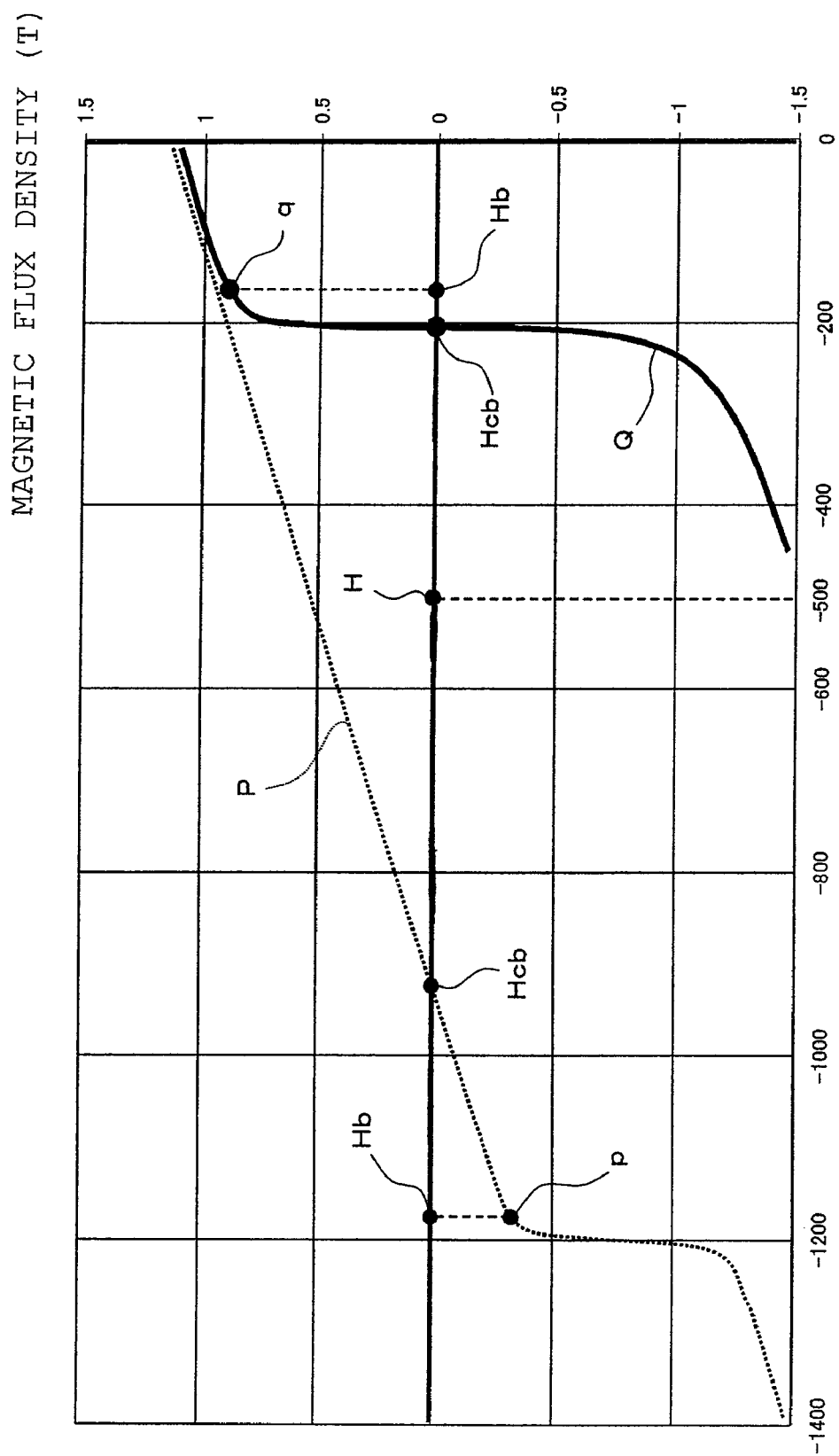
FIG. 5 is a graph showing the relationship between a flux density and field intensity of a permanent magnet.
Figure 6:
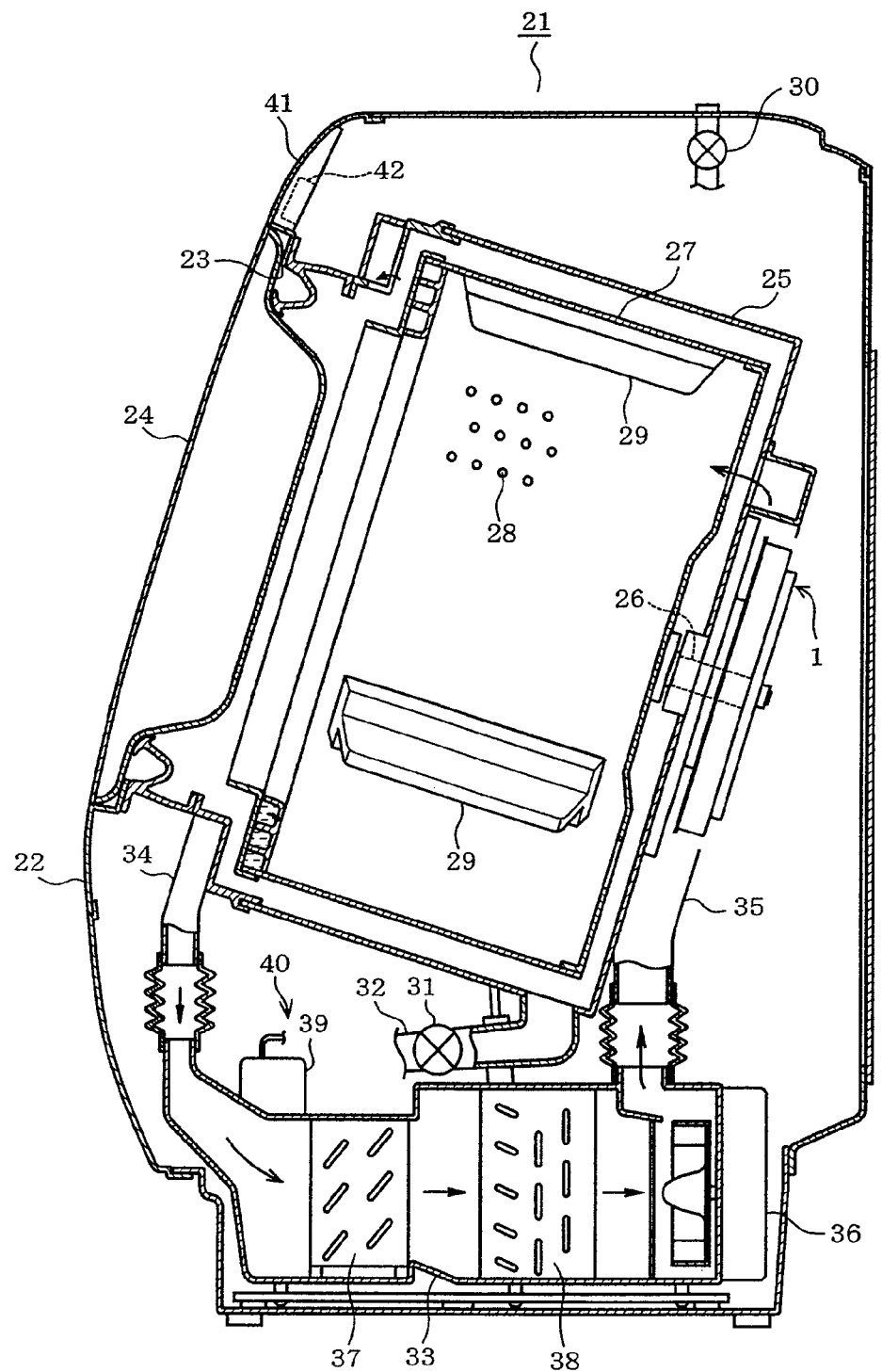
FIG. 6 is a schematic longitudinal sectional view of a drum washing machine provided with the permanent magnet motor.

Referring to FIG. 5, the magnetic characteristic of each samarium-cobalt magnet 9b will be described. FIG. 5 shows the relationship between a flux density and field intensity of a permanent magnet. In FIG. 5, a second quadrant is defined as a domain in which the magnetic flux density is larger than 0 and the field intensity is smaller than 0. A third quadrant is defined as a domain in which the magnetic flux density is smaller than 0 and the field intensity is smaller than 0. Furthermore, dot line P denotes a magnetic characteristic of each neodymium magnet 9a and solid line Q denotes a magnetic characteristic of each samarium-cobalt magnet 9b.

The magnetic characteristic of each samarium-cobalt magnet 9b (the relationship between the magnetic flux density and the field intensity) is set so that a bending point q is present in the second quadrant in a temperature range which is determined according to an electric motor to be used, for example, 0° C. to 40° C. The flux density is larger than 0 and the field intensity is smaller than 0 in the second quadrant. Furthermore, a field intensity Hb at the bending point q has an absolute value that is not more than 500 kA/m as denoted by symbol H in FIG. 5.

When the bending point q is in the second quadrant, the field intensity Hb at the bending point q is substantially the same as a coercive force Hcb of the permanent magnet. The coercive force Hcb is proportional to an intensity of magnetic field to be established by the permanent magnet. Accordingly, a larger absolute value (|Hcb|) of the coercive force Hcb is preferred. Furthermore, the field intensity Hb at the bending point q is proportional to an intensity of external field necessary to change the intensity (magnetic flux) of the permanent magnet (to be magnetized or demagnetized). The intensity of external field necessary to change the intensity of the permanent magnet is proportional to a winding current (current flowing through the stator winding 5) at the time of change in the magnetic flux. Accordingly, a larger absolute value (|Hcb|) of the coercive force Hcb is preferred in order that the intensity of external field necessary to change the intensity of the permanent magnet may be rendered as small as possible.

The characteristic increasing the absolute value (|Hcb|) of the coercive force Hcb is contradictory to the characteristic decreasing the absolute value (|Hcb|) of the field intensity Hb at the bending point q and vice versa. When the two characteristics contradictory to each other are synthesized, a larger absolute value of a ratio of the coercive force Hcb to the field intensity Hb at the bending point (|Hcb/Hb|) is preferred. In this case, the coercive force Hcb and the field intensity Hb at the bending point are negative values respectively.

The absolute value (|Hcb|) of the coercive force Hcb is smaller than the absolute value of the field intensity Hb when the bending point p is in the third quadrant as of each neodymium magnet 9a (see dot line P in FIG. 5). Accordingly, the absolute value of the aforesaid ratio (|Hcb/Hb|) is smaller than 1. On the other hand, the absolute value (|Hcb|) of the coercive force Hcb is equal to or larger than the absolute value of the field intensity Hb when the bending point q is in the second quadrant as of the samarium-cobalt magnet 9b (see solid line Q in FIG. 5). Accordingly, the absolute value of the ratio (|Hcb/Hb|) is equal to or larger than 1. Consequently, the case where the bending point is in the second quadrant is preferable to the case where the bending point is in the third quadrant. A section of the magnetic characteristic curve on the left of the bending point has a slope that is almost vertical. As a result, the absolute value of the ratio is not changed to a large degree in the case of the samarium-cobalt magnet 9b having the bending point q in the second quadrant.

When household appliances such as the drum type washing and drying machine 21 are used in a home, current consumption per electrical system is generally set at about 15 A. Accordingly, it is economically preferable that motor driving elements and control system circuit elements have respective rated currents with an upper limit of 15 A. These elements have respective short-time ratings which are about twice as large as the upper limit, that is, 30 A. When the doubled current is applied to the permanent magnet motor 1, a field intensity at the bending point is obtained by back calculation on the basis of current necessary for flux change in the permanent magnets. The obtained field intensity is about 500 kA/m. Accordingly, it is desirable that the field intensity at the bending point is equal to or smaller than 500 kA/m. Furthermore, when the bending point q is in the second quadrant as in the samarium-cobalt magnet 9b, a variation range of an amount of magnetic flux is large, and a ratio of winding current necessary for change in an amount of magnetic flux to the variation range of the amount of magnetic flux can be rendered minimum.

The following describes the construction of the drum type washing and drying machine provided with the above-described permanent magnet motor 1. The drum type washing and drying machine 21 includes an outer cabinet 22 which serves as an outer casing and has a front formed with a circular laundry access opening 23. The access opening 23 is closed and opened by a door 24. A cylindrical water tub 25 is disposed in the outer cabinet 22. The water tub 25 has a closed rear and accordingly a bottom. The above-described permanent magnet motor 1 (the stator 2) is secured by screws to the central rear of the water tub 25. The permanent magnet motor 1 has a rotational shaft 26 with a rear end (right end as viewed in FIG. 6) fixed to the shaft mounting portion 10 of the permanent magnet motor 1 (the rotor 3) and a front end protruding into the water tub 25. A bottomed cylindrical drum 27 with a closed rear is fixed to the front end of the rotational shaft 26 so as to be coaxial with the water tub 25. The drum 27 is rotated together with the rotor 3 and the rotational shaft 26 by the permanent magnet motor 1. The drum 27 has a plurality of circulation holes 28 through which air and water are allowed to pass therethrough. The drum 27 further has a plurality of baffles 29 scraping and disentangling laundry in the drum 27.

A water-supply valve 30 is connected to the water tub 25. When the water-supply valve 30 is opened, water is supplied into the water tub 25. Furthermore, a drain hose 32 provided with a drain valve 31 is connected to the water tub 25. When the drain valve 31 is opened, wash liquid in the water tub 25 is discharged through the drain hose 32. A ventilating duct 33 extending in the front-back direction is mounted below the water tub 25 in the outer cabinet 22. The ventilating duct 33 has a front end connected through a front duct 34 to the water tub 25 and a rear end connected through a rear duct 35 to the water tub 25. A ventilating fan 36 is provided in the rear end of the ventilating duct 33. Air in the water tub 25 is fed through the front duct 34 into the ventilating duct 33 and is returned through the rear duct 35 into the water tub 25 as shown by arrows in FIG. 1.

An evaporator 37 is provided in the ventilating duct 33 so as to be located at the front end side. A condenser 38 is provided in the ventilating duct 33 so as to be located at the rear end side. The evaporator 37 and the condenser 38 constitute a heat pump 40 together with a compressor 39 and a throttle valve (not shown). In operation of the heat pump 40, air flowing through the ventilating duct 33 is dehumidified by the evaporator 37 and heated by the condenser 38, thereafter being circulated into the water tub 25.

An operation panel 41 is mounted on a front of the outer cabinet 22 so as to be located over the door 24. A plurality of operation switches (not shown) is mounted on the operation panel 41 to set an operation course and the like. The operation panel 41 is electrically connected to a control circuit 42 (serving as a control). The control circuit 42 mainly comprises a microcomputer and controls an overall operation of the drum type washing and drying machine 21. The control circuit 42 executes various operation courses while controlling the permanent magnet motor 1, water-supply valve 30, drain valve 31, compressor 39, throttle valve and the like according to the contents set on the operation panel 41 based on a control program (not shown).

Figure 7:
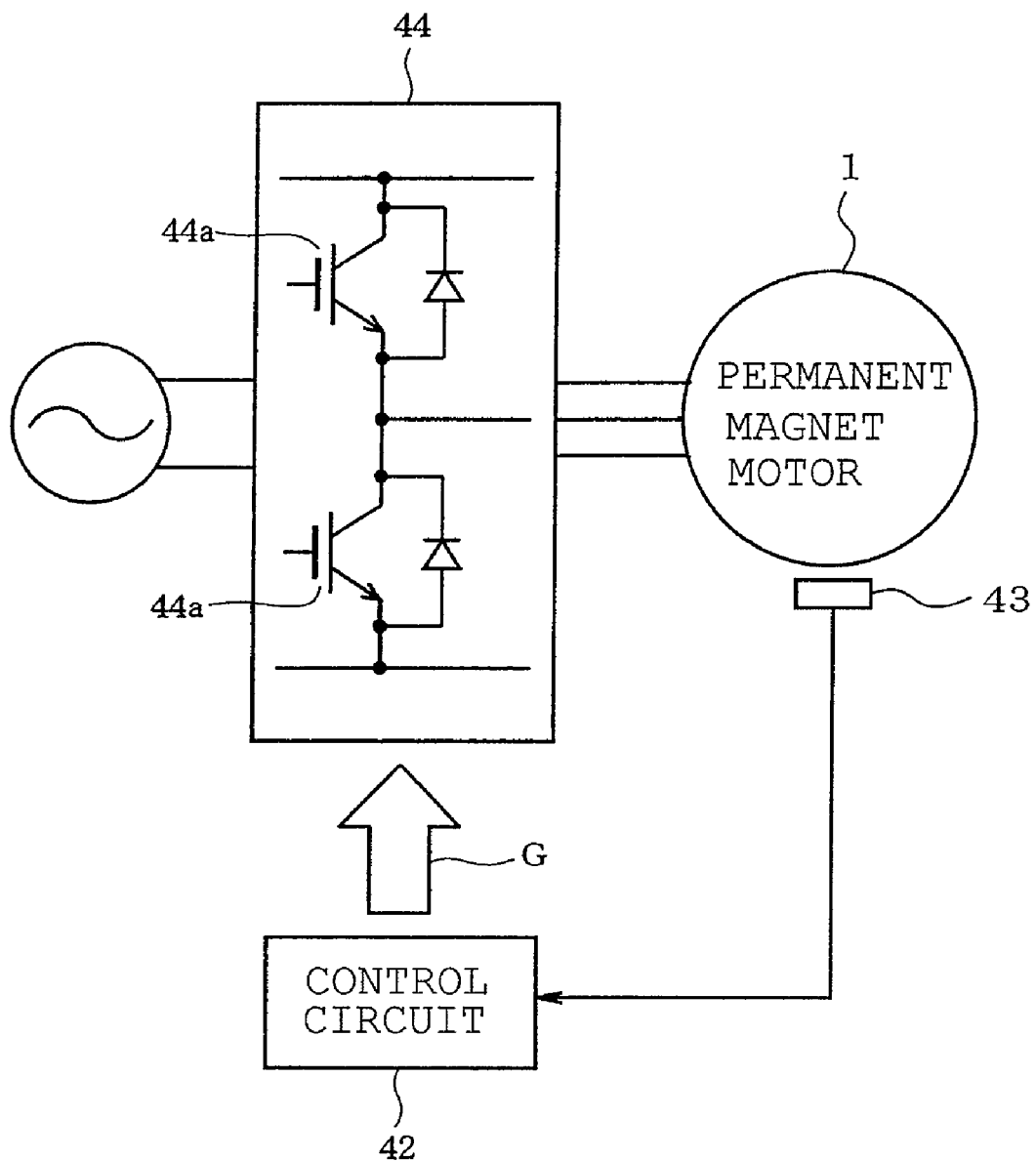
FIG. 7 is a schematic block diagram showing an electrical arrangement of the drum washing machine.

A magnetic sensor 43 (see FIG. 7) is provided on a portion of the motor 1 opposed to the permanent magnets 9 to detect magnetism of the permanent magnets 9. The magnetic sensor 43 is mounted on a circuit board (not shown) further mounted on the stator 2 side. The control circuit 42 computes a rotational position of the rotor 3 based on a detection signal supplied thereto from the magnetic sensor 43. The control circuit 42 generates a gate drive signal G according to results of computation to drive an inverter circuit 44 comprising six insulated gate bipolar transistors (IGBTs) 44a connected into a three-phase bridge configuration. Only two of the IGBTs 44a are shown in FIG. 7. Consequently, the control circuit 42 rotates the rotor 3 while controlling energization to the stator windings 5.

The following describes the operation of the drum type washing and drying machine provided with the permanent magnet motor 1. When the control circuit 42 drives the inverter circuit 44 to energize the stator winding 5, external field due to armature reaction (magnetic field produced by the current flowing through the stator winding 5) acts on the permanent magnets 9a and 9b of the rotor 3. Each samarium-cobalt magnet 9b having a smaller coercive force is magnetized or demagnetized by the external field due to the armature reaction. As a result, a flux content interlinked with the stator winding 5 (interlinkage flux) can be increased or decreased. In the embodiment, the control circuit 42 controls energization to the stator windings 5 so that the magnetization state of each samarium-cobalt magnet 9b is changed for every operation step (wash, dehydration and drying steps).

Operations in the respective operation steps will now be described in sequence. Firstly, the control circuit 42 opens the water-supply valve 30 to supply water into the water tub 25 in the wash step. The control circuit 42 then rotates the drum 27 so that washing is carried out. In the wash step, the drum 27 needs to be rotated with high torque in order that laundry containing water may be scraped upward, although a rotational speed is low. In this case, the control circuit 42 controls energization to the stator winding 5 by the inverter circuit 44 so that the samarium-cobalt magnets 9b are magnetized. As a result, since a flux content acting on the stator winding 5 is increased such that a magnetic force is intensified, the drum 27 can be rotated with high torque at low speeds.

The control circuit 42 then opens the drain valve 31 to discharge wash liquid out of the water tub 25 in the dehydration step. The control circuit 42 subsequently causes the drum 27 to be rotated at high speeds so that laundry is dehydrated. In the dehydration step, the drum 27 needs to be rotated at high speeds for improvement in a dehydration efficiency, although torque is low. The control circuit 42 then controls energization to the stator windings 5 by the inverter circuit 44 so that the samarium-cobalt magnets 9b are demagnetized. As a result, since an amount of magnetic flux acting on the stator windings 5 is decreased such that a magnetic force is weak, the drum 27 can be rotated with low torque at high speeds.

Finally, the control circuit 42 drives the ventilating fan 36 and the heat pump 40 and rotates the drum 27 in the drying step, thereby drying laundry. In the drying step, the control circuit 42 controls energization to the stator windings 5 by the inverter circuit 44 so that the samarium-cobalt magnets 9b are magnetized for a subsequent wash step. Consequently, an amount of magnetic flux acting on the stator windings 5 can previously be increased. Accordingly, the drum 27 can readily be rotated with high torque at low speeds in a subsequent wash step.

According to the above-described permanent magnet motor 1, two types of permanent magnets 9a and 9b having different coercive forces are provided. The samarium-cobalt magnets 9b having a smaller coercive force are magnetized or demagnetized by the external field due to the armature reaction. As a result, an amount of magnetic flux of the permanent magnets 9 can be adjusted according to a load to be driven (the drum 27 of the drum type washing and drying machine 21 in the embodiment). This can prevent an amount of magnetic flux of the permanent magnets 9 from being constant and further prevent dielectric breakdown during high-speed rotation and power reduction during low-speed rotation.

The two types of permanent magnets 9a and 9b having different coercive forces are disposed substantially in an annular arrangement so that each type constitutes one magnetic pole. This simple construction can realize adjustment of flux content of the permanent magnets 9 according to the load to be driven (the drum 27). Furthermore, the two types of permanent magnets 9a and 9b forming magnetic paths comprise the neodymium magnet having a larger coercive force and the samarium-cobalt magnet 9b having a smaller coercive force. Consequently, flux contents of the magnetic paths can be rendered substantially the same, whereupon the drum 27 can be driven with a stable amount of magnetic flux.

According to the drum type washing and drying machine 21 of the embodiment, the amount of magnetic flux of the permanent magnets 9 can be adjusted efficiently according to the operation steps.

A second embodiment of the invention will be described with reference to FIGS. 8 and 9. Identical or similar parts in the second embodiment are labeled by the same reference symbols as those in the first embodiment and accordingly, the description of these parts will be eliminated. In the second embodiment, neodymium magnets 9c are used instead of the samarium-cobalt magnets 9b. Thus, each of the permanent magnets 9a and 9c comprises a neodymium magnet which is a rare earth magnet in the second embodiment.

Figure 8:
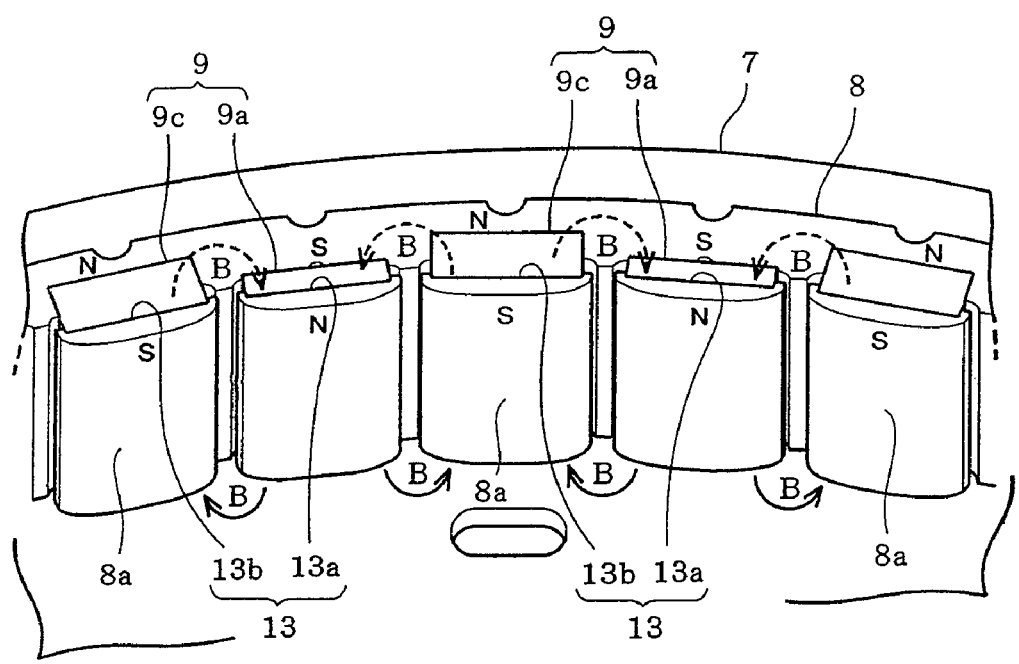
FIG. 8 is a view similar to FIG. 4, showing the permanent magnet motor in accordance with a second embodiment of the invention.

The permanent magnets 9 include rectangular neodymium magnets 9a inserted into the respective insertion holes 13a and rectangular neodymium magnets 9c inserted into the respective insertion holes 13b as shown in FIG. 8. Each neodymium magnet 9a has a coercive force of about 900 kA/m, where as each neodymium magnet 9c has a coercive force of about 200 kA/m. Each neodymium magnet 9a thus has a coercive force about 4.5 times as large as each neodymium magnet 9c. More specifically, the permanent magnets 9 include two types of permanent magnets 9a and 9c having different coercive forces. The permanent magnets 9a and 9c are disposed alternately in the rotor core 8 substantially into an annular arrangement.

Furthermore, each of the two types of permanent magnets 9a and 9c is disposed so as to constitute one magnetic pole and so as to have a magnetization direction following a radial direction of the permanent magnet motor 1 (the direction heading a gap between the stator 2 and the rotor 3 out of the outer circumference of the permanent magnet motor 1). As a result, the permanent magnets 9a and 9c adjacent to each other have magnetic poles located oppositely or are oppositely magnetized. More specifically, the north pole (N) of one of two types of permanent magnets is located inside and the north pole (N) of the other type of permanent magnet is located outside. Consequently, a magnetic path (magnetic flux) is established, for example, in the direction of arrow B in FIG. 8 between the neodymium magnet 9a and the neodymium magnet 9b. Broken line arrows in FIG. 8 denote magnetic flux routed through the rotor core 8. As the result of the above-described construction, a magnetic path is established so as to pass through each neodymium magnet 9a with a larger coercive force and each neodymium magnet 9c with a smaller coercive force.

A magnetic characteristic of the neodymium magnet 9c will now be described with reference to FIG. 9, in which dot line P denotes a magnetic characteristic of each neodymium magnet 9a and solid line R denotes a magnetic characteristic of each neodymium magnet 9c. The magnetic characteristic of each samarium-cobalt magnet 9c (the relationship between the magnetic flux density and the field intensity) is set so that a bending point q is present in a second quadrant in a temperature range which is determined according to an electric motor to be used, for example, 0° C. to 40° C. The flux density is larger than 0 and the field intensity is smaller than 0 in the second quadrant. Furthermore, a field intensity Hb at the bending point q has an absolute value that is not more than 500 kA/m as denoted by symbol H in FIG. 9.

When the bending point q is in the second quadrant, the field intensity Hb at the bending point q is substantially the same as a coercive force Hcb of each permanent magnet. The coercive force Hcb is proportional to an intensity of magnetic field to be established by each permanent magnet. Accordingly, a larger absolute value (|Hcb|) of the coercive force Hcb is preferred. Furthermore, the field intensity Hb at the bending point is proportional to an intensity of external field necessary to change the intensity (magnetic flux) of each permanent magnet (to be magnetized or demagnetized). The intensity of external field necessary to change the intensity of each permanent magnet is proportional to a winding current (current flowing through the stator windings 5) at the time of change in the magnetic flux. Accordingly, a larger absolute value (|Hcb|) of the coercive force Hcb is preferred in order that the intensity of external field necessary to change the intensity of each permanent magnet may be rendered as small as possible.

The characteristic increasing the absolute value (|Hcb|) of the coercive force Hc is contradictory to the characteristic decreasing the absolute value (|Hcb|) of the field intensity Hb at the bending point q and vice versa. When the two characteristics contradictory to each other are synthesized, a larger absolute value of a ratio of the coercive force Hcb to the field intensity Hb at the bending point (|Hcb/Hb|) is preferred. In this case, the coercive force Hcb and the field intensity Hb at the bending point are negative values respectively.

Figure 9:
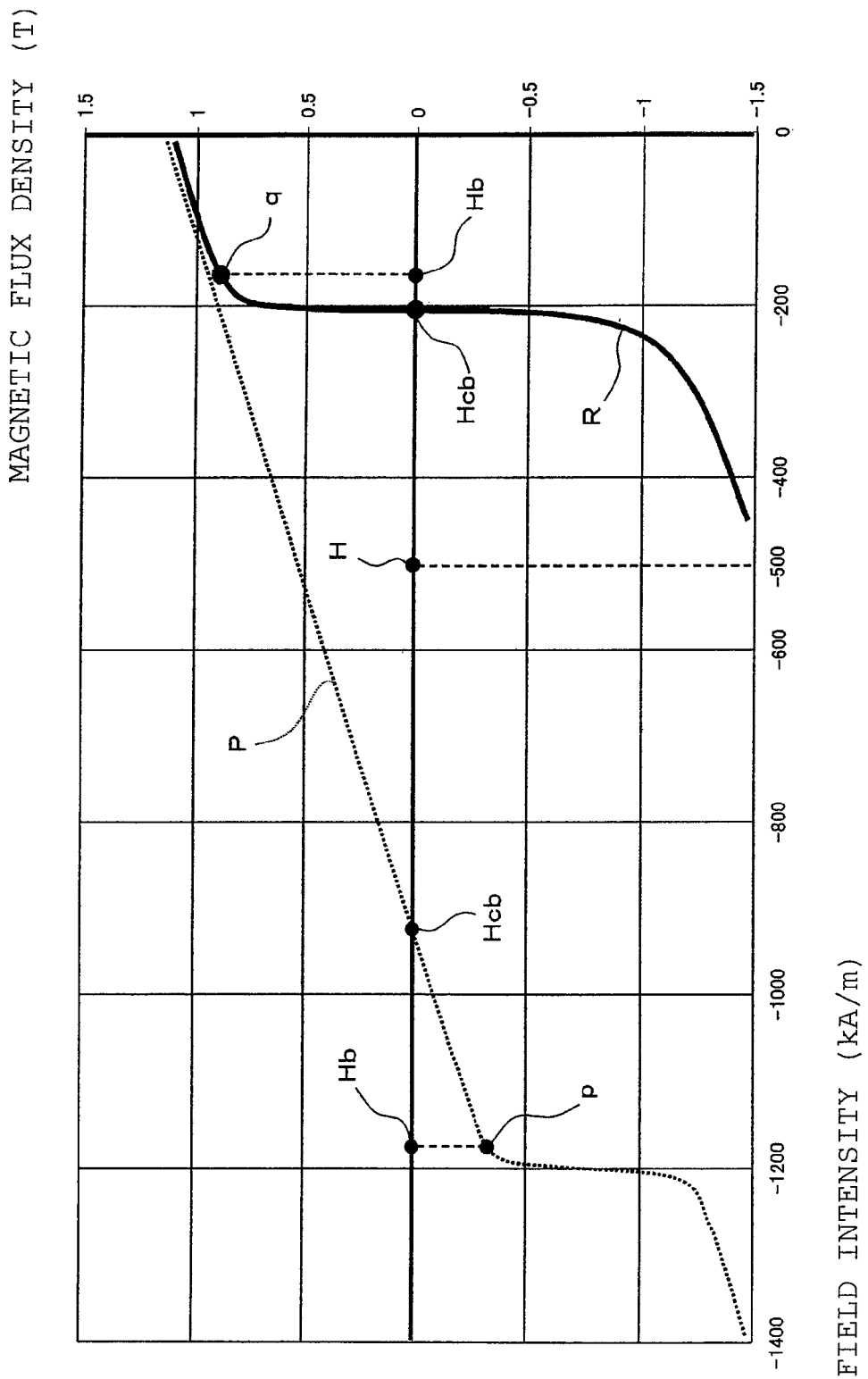
FIG. 9 is a graph similar to FIG. 5.

The absolute value (|Hcb|) of the coercive force Hcb is smaller than the absolute value (|Hb|) of the field intensity Hb when the bending point p is in a third quadrant as of the neodymium magnet 9a (see dot line P in FIG. 9). The flux density is smaller than 0 and the field intensity is smaller than 0 in the third quadrant. Accordingly, the absolute value of the aforesaid ratio (|Hcb/Hb|) is smaller than 1. On the other hand, the absolute value (|Hcb|) of the coercive force Hcb is equal to or larger than the absolute value of the field intensity Hb when the bending point q is in the second quadrant as of the samarium-cobalt magnet 9b (see solid line R in FIG. 9). Accordingly, the absolute value of the ratio (|Hcb/Hb|) is equal to or larger than 1. Consequently, the case where the bending point is in the second quadrant is preferable to the case where the bending point is in the third quadrant. A section of the magnetic characteristic curve on the left of the bending point has a slope that is almost vertical. As a result, the absolute value of the ratio is not changed to a large degree in the case of the neodymium magnet 9c having the bending point q in the second quadrant.

When household appliances such as the drum type washing and drying machine 21 are used in a home or residence, current consumption per electrical system is generally set at about 15 A. Accordingly, it is preferable from an economical point of view that motor driving elements and control system circuit elements have respective rated currents with an upper limit of 15 A. These elements have respective short-time ratings which are about twice as large as the upper limit, that is, 30 A. When the doubled current is applied to the permanent magnet motor 1, a field intensity at the bending point is obtained by back calculation on the basis of current necessary for flux change in the permanent magnets. The obtained field intensity is about 500 kA/m. Accordingly, it is desirable that the field intensity at the bending point is equal to or smaller than 500 kA/m. Furthermore, when the bending point q is in the second quadrant as in the neodymium magnet 9c, variations in the flux content are large, and a ratio of winding current necessary for change in the flux content to the variations in an amount of magnetic flux can be rendered minimum.

A third embodiment of the invention will be described with reference to FIG. 10. Identical or similar parts in the third embodiment are labeled by the same reference symbols as those in the first embodiment and accordingly, the description of these parts will be eliminated. In the third embodiment, alnico magnets 9d mainly composed of aluminum (Al), nickel (Ni) and cobalt (Co) are used instead of the samarium-cobalt magnets 9b.

Figure 10:
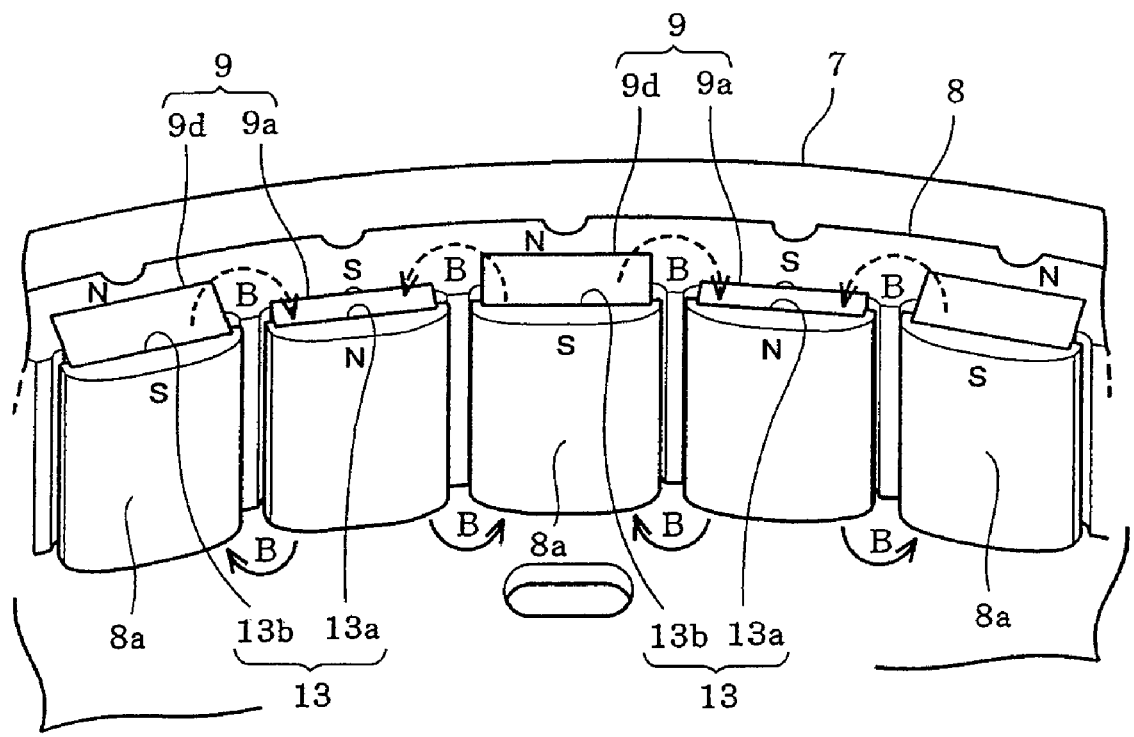
FIG. 10 is a view similar to FIG. 4, showing the permanent magnet motor in accordance with a third embodiment of the invention.

The permanent magnets 9 include the rectangular neodymium magnets 9a inserted into the respective insertion holes 13a and rectangular alnico magnets 9d inserted into the respective insertion holes 13b as shown in FIG. 10. Each neodymium magnet 9a has a coercive force of about 900 kA/m, where as each alnico magnet 9d has a coercive force of about 100 kA/m. Each neodymium magnet 9a thus has a coercive force about 9 times as large as each alnico magnet 9d. More specifically, the permanent magnets 9 include two types of permanent magnets 9a and 9d having different coercive forces. The permanent magnets 9a and 9d are disposed alternately in the rotor core 8 substantially into an annular arrangement.

Furthermore, each of the two types of permanent magnets 9a and 9d is disposed so as to constitute one magnetic pole and so as to have a magnetization direction following a radial direction of the permanent magnet motor 1 (the direction heading a gap between the stator 2 and the rotor 3 out of the outer circumference of the permanent magnet motor 1). As a result, the permanent magnets 9a and 9d adjacent to each other have magnetic poles located oppositely or are oppositely magnetized. More specifically, the north pole (N) of one of two types of permanent magnets is located inside and the north pole (N) of the other type of permanent magnet is located outside. Consequently, a magnetic path (magnetic flux) is established, for example, in the direction of arrow B in FIG. 10 between the neodymium magnet 9a and the alnico magnet 9d. Broken line arrows in FIG. 10 denote magnetic flux routed through the rotor core 8. As the result of the above-described construction, a magnetic path is established so as to pass through each neodymium magnet 9a with a larger coercive force and each alnico magnet 9d with a smaller coercive force.

Each alnico magnet 9d has a magnetic characteristic approximate to those of each samarium-cobalt magnet 9b and each neodymium magnet 9c (see solid line Q in FIG. 5 and solid line R in FIG. 9). Accordingly, the construction of the third embodiment can also render the variations in the flux content larger and minimize the ratio of winding current necessary for change in the flux content to the variations in an amount of magnetic flux.

A fourth embodiment of the invention will be described with reference to FIGS. 11 and 12. The fourth embodiment will be described with respect to the same construction (using the neodymium magnets 9c instead of the samarium-cobalt magnets 9b) as in the second embodiment with reference to the relationship between the magnetic polarization and the field intensity of the neodymium magnets 9c, but not the relationship between the flux density and the field intensity of the neodymium magnets 9c.

Figure 11:
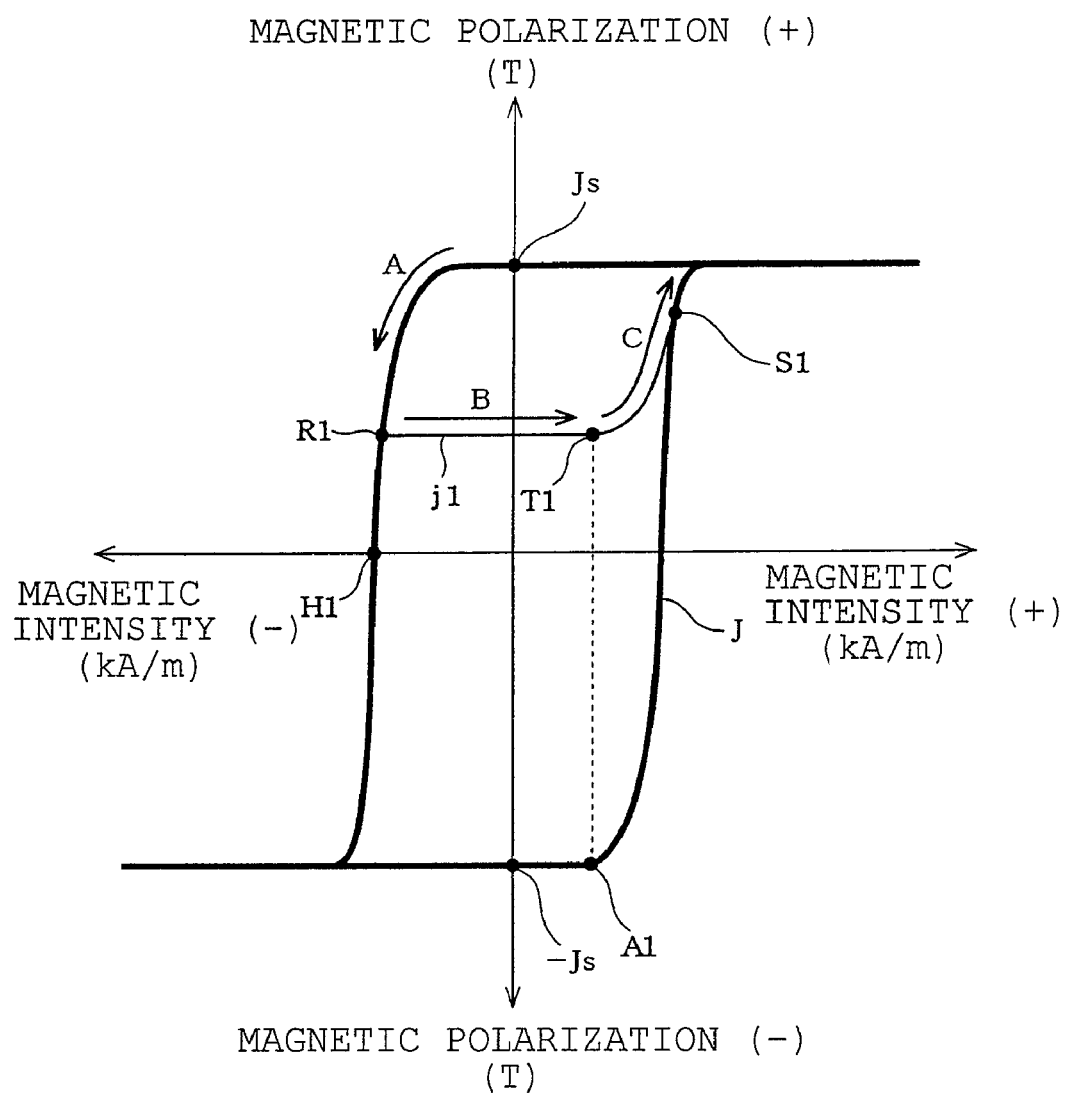
FIG. 11 is a graph showing the relationship between magnetic polarization and field intensity of the permanent magnets during demagnetization.

Firstly, the magnetic characteristic will be described in the case where the neodymium magnets 9c are demagnetized, with reference to FIG. 11 showing the relationship between the magnetic polarization and the field intensity of the neodymium magnets 9c. Solid line J in FIG. 11 denotes a hysteresis loop (major loop) from a saturated magnetic polarization (Js) of the neodymium magnets 9c to a saturated magnetic polarization (−Js) at the opposed pole. In FIG. 11, solid line j1 denotes a hysteresis loop (minor loop) from point R1 present in a second quadrant in the major loop J to the point S1 present in a first quadrant in the major loop J through point T1 at the magnetization side (the right side in FIG. 11). When the neodymium magnets 9c are demagnetized, an operating point of the neodymium magnets 9c is displaced along the minor loop J1 in the first and second quadrants in the fourth embodiment.

Point R1 is an arbitrary point in a section between point Js (where field intensity is at 0 and magnetic polarization is at Js) and point H1 (where field intensity is at −Hej (coercive force of neodymium magnet 9c) and magnetic polarization is at 0) on the major loop J in the second quadrant. Point T1 is set so that the flux density thereof is substantially the same as the flux density at an inflection point A1 of the magnetic susceptibility of the major loop J in a fourth quadrant. Point S1 is a point where minor loop J1 approaches asymptotically to the major loop J in a first quadrant. In a section from point R1 to point T1 in the minor loop J1, each neodymium magnet 9c has a characteristic that the magnetic polarization is not increased, that is, the magnetic susceptibility is substantially zeroed when the magnetizing flux is caused to act on each neodymium magnet 9c. Furthermore, each neodymium magnet 9c has a magnetic characteristic that the magnetization susceptibility thereof is considerably increased such that each neodymium magnet 9c approaches asymptotically to the major loop J at point S1 when the magnetization field exceeding point T1 is caused to act thereon. The control circuit 42 energizes the stator windings 5 so that each neodymium magnet 9c produces an external field (the demagnetization field) that has a direction opposed to the direction of magnetization of each neodymium magnet 9c. Consequently, the operating point of each neodymium magnet 9c is displaced on the major loop J to the demagnetization side (see arrow A in FIG. 11) by the action of each neodymium magnet 9c.

When the operating point of each neodymium magnet 9c has reached point R1, the control circuit 42 deenergizes the stator windings 5 to stop generation of external field (to remove external field). The operating point of each neodymium magnet 9c is displaced to the magnetization side (to the right side in FIG. 11) on the minor loop J1 by the action of neodymium magnets 9a having a larger coercive force than the neodymium magnets 9c (see arrow B in FIG. 11). In this case, when the magnetization field by each neodymium magnet 9a is smaller as an absolute value than the field intensity at point T1, the operating point of each neodymium magnet 9c is stopped in the section between point R1 and point T1 on the minor loop J1. The demagnetization field generated by each neodymium magnet 9c (the magnetic field in the direction opposed to the direction in which each neodymium magnet 9c is magnetized) is balanced with the magnetization field generated by each neodymium magnet 9a at the point where the operating point of each neodymium magnet 9c is stopped, or vice versa. As a result, each neodymium magnet 9c can be maintained at the state in which the magnetic polarization of each neodymium magnet 9c is substantially equal to the magnetic polarization at point R1 (the state where each neodymium magnet 9c has been demagnetized). Accordingly, each permanent magnet 9c whose amount of magnetic flux has been reduced by demagnetization can stably be obtained.

However, when the magnetization field by each neodymium magnet 9c is larger as an absolute value than the field intensity at point T1, the operating point of each neodymium magnet 9c is displaced along the minor loop J1 to the magnetization side, whereupon the operating point is moved through point S1 onto the major loop J (see arrow C in FIG. 11). In this case, the magnetic polarization of each neodymium magnet 9c becomes larger than the magnetic polarization at point R1 (the magnetic polarization after demagnetization). More specifically, an amount of magnetic flux of each demagnetized neodymium magnet 9c is returned to the amount of magnetic flux before demagnetization (the amount of magnetic flux before the demagnetization field is caused to act). Accordingly, each permanent magnet 9c whose amount of magnetic flux is reduced by demagnetization cannot stably be obtained. Accordingly, a longer section (where the magnetic susceptibility is substantially at 0) from point R1 to point T1 on the minor loop j1 is desired. For this purpose, the field intensity at point T1 should be set so as to be substantially the same as the field intensity at the inflection point A1 of the magnetic susceptibility present in the fourth quadrant or larger than the field intensity at the inflection point A1.

Figure 12:
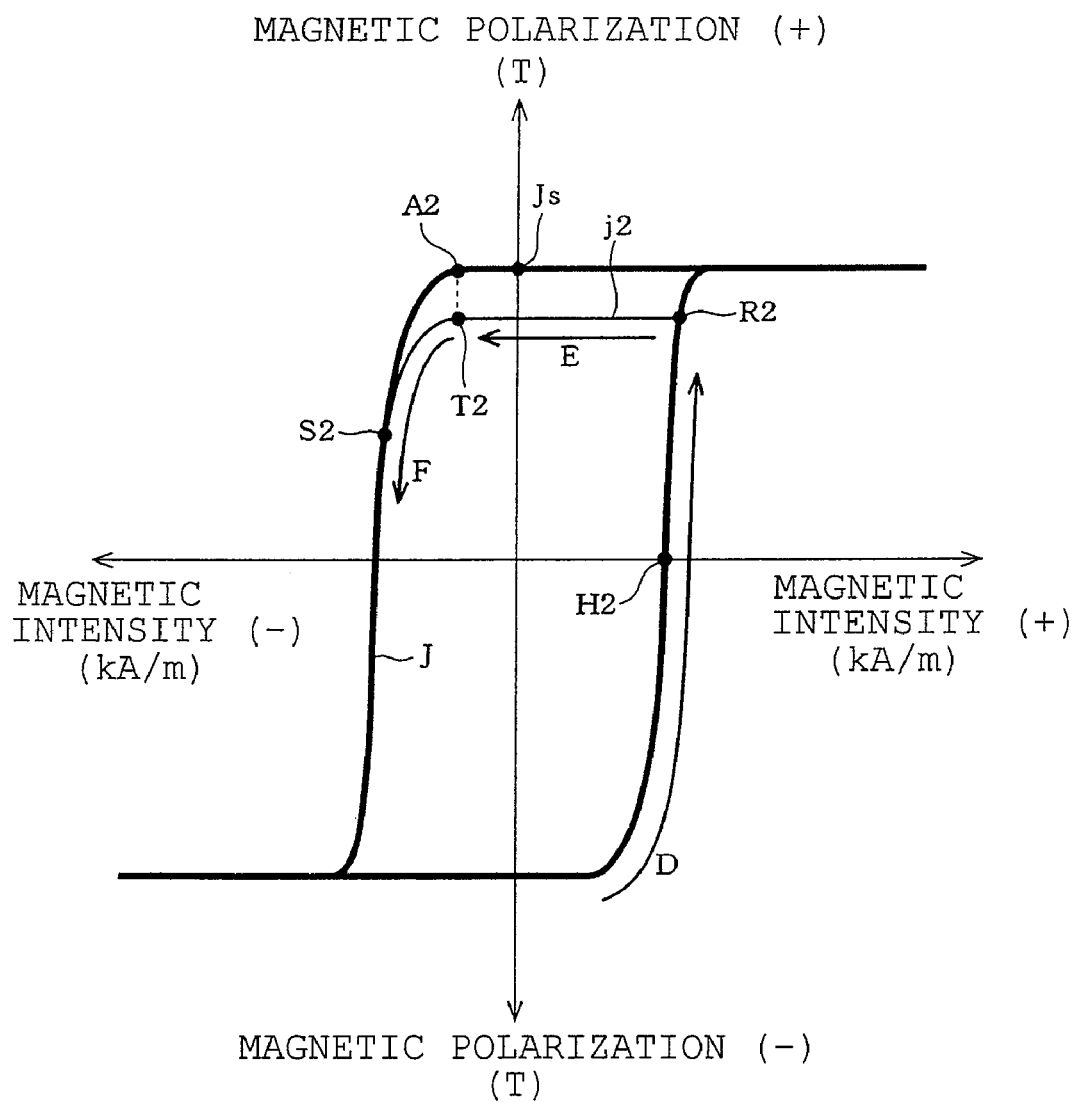
FIG. 12 is a view similar to FIG. 11 during demagnetization.

With reference to FIG. 12, the following describes the magnetic characteristic in the case where each neodymium magnet 9c is magnetized. FIG. 12 shows the relationship between the magnetic polarization and field intensity of each neodymium magnet 9c. Solid line J in FIG. 12 is the same as the hysteresis loop J as shown in FIG. 11. Solid line j2 in FIG. 12 denotes a hysteresis loop (minor loop) from point R2 present on the major loop J in the first quadrant through the point T2 at the demagnetization side (left side in FIG. 12) to point S2 present on the major loop J in the second quadrant. The operating point of each neodymium magnet 9c is displaced along the minor loop j2 in the first and second quadrants when each neodymium magnet 9c is magnetized. Point R2 can be set as an arbitral point in a section from point H2 on the major loop J from point Js, that is, on the major loop J in the first quadrant. On point H2, the field intensity is equal to Hcj (the coercive force of each neodymium magnet 9c and the magnetic polarization is at 0. On point Js, the field intensity is at 0 and the magnetic polarization is equal to Js. Point T2 is set so as to have the magnetic intensity substantially the same as the field intensity at inflection point A2 of magnetic susceptibility on the major loop J in the second quadrant. Point S2 is a point where the minor loop j2 approaches asymptotically to the major loop J in the second quadrant.

In a section from point R2 to point T2 on the minor loop j2, each neodymium magnet 9c has a characteristic that the magnetic polarization is not reduced even when the demagnetization field is caused to act thereon, that is, the magnetic susceptibility becomes substantially at 0. Furthermore, each neodymium magnet 9c has a characteristic that when the demagnetization field exceeding point T2 is caused to act thereon, the magnetic susceptibility is reduced to a large degree and approaches asymptotically to the major loop J on point S2.

The control circuit 42 energizes the stator windings 5 so that external field (magnetization field) having the same direction as the magnetization direction of each neodymium magnet 9c. The operating point of each neodymium magnet 9c is displaced to the magnetization side (see arrow D in FIG. 12) on the major loop J. When the operating point of each neodymium magnet 9c has reached point R2, the control circuit 42 stops energization to the stator winding 5 thereby to stop generation of the external field (or remove the external field). As a result, the operating point of each neodymium magnet 9c is displaced to the demagnetization side on the minor loop j2 by the demagnetization field generated by each neodymium magnet 9c (the magnetic field generated in the direction opposite to the demagnetization direction (to the left side in FIG. 12) of each neodymium magnet 9c (see arrow E in FIG. 12).

In this case, when the demagnetization field generated by each neodymium magnet 9a is smaller as an absolute value than the field intensity at point T2, the operating point of each neodymium magnet 9c is stopped in the section between point R2 and point T2 on the minor loop j2. The demagnetization field generated by each neodymium magnet 9c is balanced with the magnetization field generated by each neodymium magnet 9a at the point where the operating point of each neodymium magnet 9c is stopped, or vice versa. As a result, each neodymium magnet 9c can be maintained at the state in which the magnetic polarization of each neodymium magnet 9c is substantially equal to the magnetic polarization at point R2 (the state where each neodymium magnet 9c has been magnetized). Accordingly, each permanent magnet 9c whose amount of magnetic flux has been reduced by demagnetization can stably be obtained.

However, when the demagnetization field by each neodymium magnet 9c is larger as an absolute value than the field intensity at point T2, the operating point of each neodymium magnet 9c is displaced along the minor loop j2 to the demagnetization side, whereupon the operating point is moved through point S2 onto the major loop J (see arrow F in FIG. 12). In this case, the magnetic polarization of each neodymium magnet 9c becomes smaller than the magnetic polarization at point R2 (the magnetic polarization after magnetization). More specifically, an amount of magnetic flux of each magnetized neodymium magnet 9c is returned to the amount of magnetic flux before magnetization (the amount of magnetic flux before the magnetization field is caused to act). Accordingly, each permanent magnet 9c whose amount of magnetic flux is reduced by magnetization cannot stably be obtained. Accordingly, a longer section (where the magnetic susceptibility is substantially at 0) from point R2 to point T2 on the minor loop j2 is desired. For this purpose, the field intensity at point T2 should be set so as to be substantially the same as the field intensity at the inflection point A2 of the magnetic susceptibility present in the second quadrant or smaller than the field intensity at the inflection point A2 (larger as an absolute value).

According to the fourth embodiment, each neodymium magnet 9c can be maintained in the demagnetized or magnetized state. Consequently, the magnetization state of each neodymium magnet 9c can stably be adjusted, which can enlarge an adjustable range of amount of magnetic flux of each permanent magnet 9. Furthermore, the permanent magnet motor 1 employing the above-described permanent magnets 9 can provide efficient adjustment of amount of magnetic flux of each permanent magnet 9. Consequently, electric power consumed for drive of the permanent magnet motor 1 can be suppressed.

The invention should not be limited to the foregoing embodiments. The embodiments may be modified or enlarged as follows. Two types of permanent magnets 9 having different coercive forces should not be limited to the above-described combinations of neodymium magnets 9a and samarium-cobalt magnets 9b, neodymium magnets 9a and 9c and neodymium magnets 9a and alnico magnets 9d. Other types of permanent magnets may be employed, instead. In this case, it is preferable that a coercive force of one type of permanent magnet is about twice as large as a coercive force of the other type of permanent magnet or above.

Furthermore, the permanent magnets 9 should not be limited to two types. Three, four or five types of permanent magnets having different coercive forces may be employed. In this case, the control circuit 42 may be arranged to change the magnetization state of the permanent magnets having a relatively smaller coercive force at every operation step.

Means for adjusting the flux content of each permanent magnet 9 should not be limited to the arrangement of controlling energization to the stator windings 5 by the inverter circuit 44. For example, a winding other than the stator windings 5 may be provided and controlled so as to be energized and deenergized.

The permanent magnet motor 1 of the invention may be applied to washing machines with no drying function and vertical axis type washing machines in which a tub is rotated about a vertical axis, instead of the foregoing drum type washing and drying machine 21. Furthermore, the invention may be applied to inner rotor type permanent magnet motors in which a rotor is disposed along an inner circumference of a stator, instead of the foregoing outer rotor type permanent magnet motor 1. Additionally, the permanent magnet motor 1 of the invention may be used as a motor for driving a compressor of air conditioners or the like.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A permanent magnet motor comprising:
a rotor including a rotor core; and
a plurality of permanent magnets provided inside the rotor core and establishing a plurality of magnetic poles,
wherein the permanent magnets include a plurality of types of permanent magnets having different coercive forces; and
said plurality of types of permanent magnets is disposed so that each one type constitutes one magnetic pole,
wherein one or more of the permanent magnets having relatively smaller coercive forces have:
a first magnetic characteristic that when a magnetizing field is caused to act on the permanent magnets from a point in a second quadrant in a hysteresis loop showing a relationship between magnetic polarization and field intensity, a magnetic susceptibility is substantially at 0 until reaching an inflection point thereof during magnetization, and when exceeding the inflection point of the magnetic susceptibility during the magnetization to the magnetization side, the magnetic susceptibility enters a loop approximating to the hysteresis loop in a first quadrant; and
a second magnetic characteristic that when a demagnetizing magnetic field is caused to act on the permanent magnets from a point in the first quadrant in said hysteresis loop, a magnetic susceptibility is substantially at 0 until reaching an inflection point thereof during demagnetization, and when exceeding the inflection point of the magnetic susceptibility during the demagnetization to a demagnetization side, the magnetic susceptibility enters a loop approximating to the hysteresis loop in a second quadrant.

2. The permanent magnet motor according to claim 1, wherein the permanent magnets are arranged into an annular shape.

3. The permanent magnet motor according to claim 1, wherein the permanent magnets include two types of permanent magnets which have different coercive forces and are disposed alternately so that each one type constitutes one magnetic pole.

4. The permanent magnet motor according to claim 3, wherein the coercive force of one type of permanent magnet is twice as large as the coercive force of the other type of permanent magnet or above.

5. The permanent magnet motor according to claim 1, wherein each permanent magnet with a relatively smaller coercive force has a relationship between a flux density and a field intensity that is set so that a bending point is in a second quadrant in a temperature range in which the permanent magnet motor is used.

6. The permanent magnet motor according to claim 5, wherein a field intensity at the bending point is not more than 500 kA/m.

7. The permanent magnet motor according to claim 5, wherein each permanent magnet is comprised of a rare-earth magnet.

8. The permanent magnet motor according to claim 1, wherein the inflection point of the magnetic susceptibility during the magnetization is set so as to be in a first quadrant.

9. The permanent magnet motor according to claim 1, wherein a field intensity at the inflection point of the magnetic susceptibility during the magnetization is substantially the same as or larger than field intensity at an inflection point of magnetic susceptibility in a fourth quadrant in the hysteresis loop, and a field intensity at the inflection point of the magnetic susceptibility during the demagnetization is substantially the same as or smaller than field intensity at an inflection point of magnetic susceptibility in a second quadrant in the hysteresis loop.

10. A washing machine comprising:
a permanent magnet motor; and
a control unit which controls drive of the permanent magnet motor,
wherein the permanent magnet motor includes a rotor including a rotor core and a plurality of permanent magnets provided inside the rotor core and establishing a plurality of magnetic poles;
the permanent magnets include a plurality of types of permanent magnets having different coercive forces;
said plurality of types of permanent magnets is disposed so that each one type constitutes one magnetic pole;
one or more of the permanent magnets having relatively smaller coercive forces have:
a first magnetic characteristic that when a magnetizing magnetic field is caused to act on the permanent magnets from a point in a second quadrant in a hysteresis loop showing a relationship between magnetic polarization and field intensity, a magnetic susceptibility is substantially at 0 until reaching an inflection point thereof during magnetization, and when exceeding the inflection point of the magnetic susceptibility during the magnetization to the magnetization side, the magnetic susceptibility enters a loop approximating to the hysteresis loop in a first quadrant; and
a second magnetic characteristic that when a demagnetizing magnetic field is caused to act on the permanent magnets from a point in the first quadrant in said hysteresis loop, a magnetic susceptibility is substantially at 0 until reaching an inflection point thereof during demagnetization, and when exceeding the inflection point of the magnetic susceptibility during the demagnetization to a demagnetization side, the magnetic susceptibility enters a loop approximating to the hysteresis loop in a second quadrant; and
the control is arranged so as to change a magnetization state of the permanent magnets having a relatively smaller coercive force.

11. The washing machine according to claim 10, wherein the control is arranged so as to change a magnetization state of the permanent magnets having a relatively smaller coercive force at every operation step.

12. The washing machine according to claim 11, wherein the operation step is any one of wash, dehydration and drying.

13. A control unit that controls a permanent magnet motor, wherein:
the permanent magnet motor includes a rotor including a rotor core and a plurality of permanent magnets provided inside the rotor core and establishing a plurality of magnetic poles;
the permanent magnets include a plurality of types of permanent magnets having different coercive forces;
said plurality of types of permanent magnets is disposed so that said one type constitutes one magnetic pole;
one or more of the permanent magnets having relatively smaller coercive forces have:
a first magnetic characteristic that when a magnetizing magnetic field is caused to act on the permanent magnets from a point in a second quadrant in a hysteresis loop showing a relationship between magnetic polarization and field intensity, a magnetic susceptibility is substantially at 0 until reaching an inflection point thereof during magnetization, and when exceeding the inflection point of the magnetic susceptibility during the magnetization to the magnetization side, the magnetic susceptibility enters a loop approximating to the hysteresis loop in a first quadrant; and
a second magnetic characteristic that when a demagnetizing magnetic field is caused to act on the permanent magnets from a point in the first quadrant in said hysteresis loop, a magnetic susceptibility is substantially at 0 until reaching an inflection point thereof during demagnetization, and when exceeding the inflection point of the magnetic susceptibility during the demagnetization to a demagnetization side, the magnetic susceptibility enters a loop approximating to the hysteresis loop in a second quadrant; and
the control unit is arranged so as to change a magnetization state of the permanent magnets having a relatively smaller coercive force.

* * * * *